United States Patent [19]

Kaye

[11] 4,120,215

[45] Oct. 17, 1978

[54] SAW CHAIN GRINDER

[75] Inventor: Peter D. Kaye, Monroe, Oreg.

[73] Assignee: Bell Industries, Los Angeles, Calif.

[21] Appl. No.: 662,026

[22] Filed: Feb. 27, 1976

[51] Int. Cl.² .............................................. B23D 63/00
[52] U.S. Cl. ...................................... 76/25 A; 76/37; 269/246
[58] Field of Search .......................... 76/25 A, 37, 42; 269/218, 242, 246

[56] References Cited

U.S. PATENT DOCUMENTS

| | | | |
|---|---|---|---|
| 2,811,873 | 11/1957 | Nielsen | 76/25 A X |
| 2,824,468 | 2/1958 | Nielsen | 76/25 A X |
| 3,663,003 | 5/1972 | Morse | 269/242 X |
| 3,861,664 | 1/1975 | Durkee | 269/242 X |
| 3,877,324 | 4/1975 | Silvey | 76/25 A |

FOREIGN PATENT DOCUMENTS 2,260,990  6/1973  Fed. Rep. of Germany .......... 76/25 A

*Primary Examiner*—Harold D. Whitehead
*Assistant Examiner*—James G. Smith

*Attorney, Agent, or Firm*—Kolisch, Hartwell, Dickinson & Stuart

[57] ABSTRACT

A grinder for sharpening saw chain cutting teeth includes a base, an arcuate guide arranged on the base, a power-driven rotary grinding wheel mounted on a pivotal motor arm movable with a mounting bracket along the arcuate guide and a releasable, self-centering clamp for holding a segment of a saw chain in position beneath the grinding wheel. The clamp includes laterally opposed elongate bars which support a saw chain and which are each simultaneously displaceable at equal rates toward a preselected datum line. The preselected datum line intersects a fixed, reference axis about which the mounting bracket is angularly displaced. Because the elongate bars are movable equally with respect to the preselected datum line, the lengthwise centerline of a saw chain will always be maintained substantially aligned on the preselected datum line regardless of the width of the chain. The arcuate guide is an elongate bar having an arcuate guide track which receives the motor arm mounting bracket. The arcuate guide is pivotal about a pivot axis so that the mounting bracket may be angularly displaced along the arcuate guide and offset at varying distances from the reference axis.

11 Claims, 11 Drawing Figures

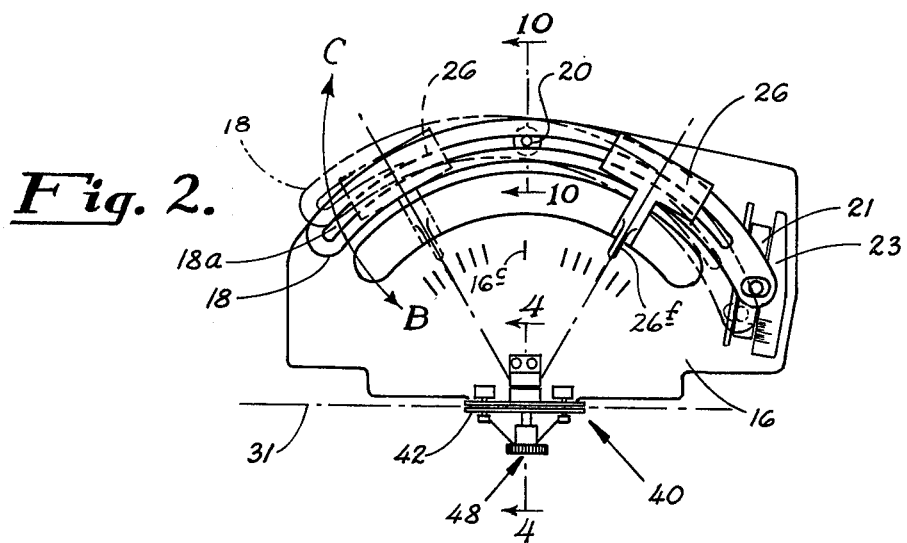
Fig. 2.
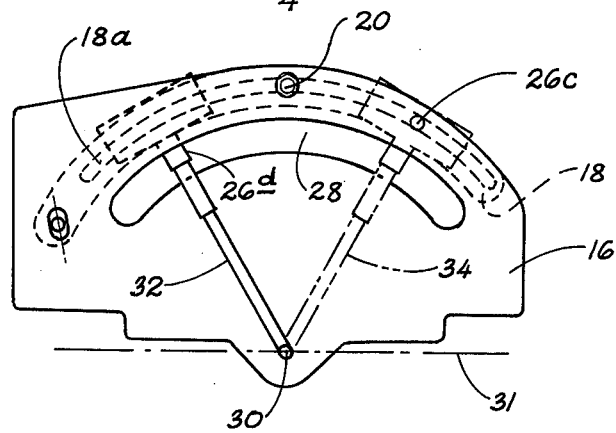
Fig. 3.
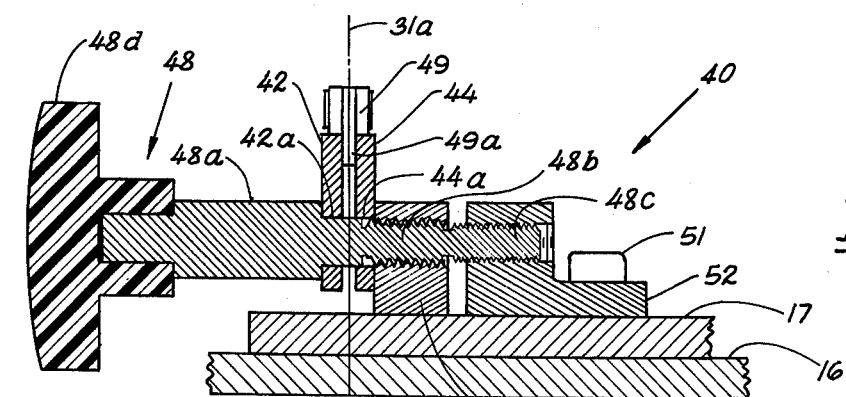
Fig. 4.
Fig. 4a.

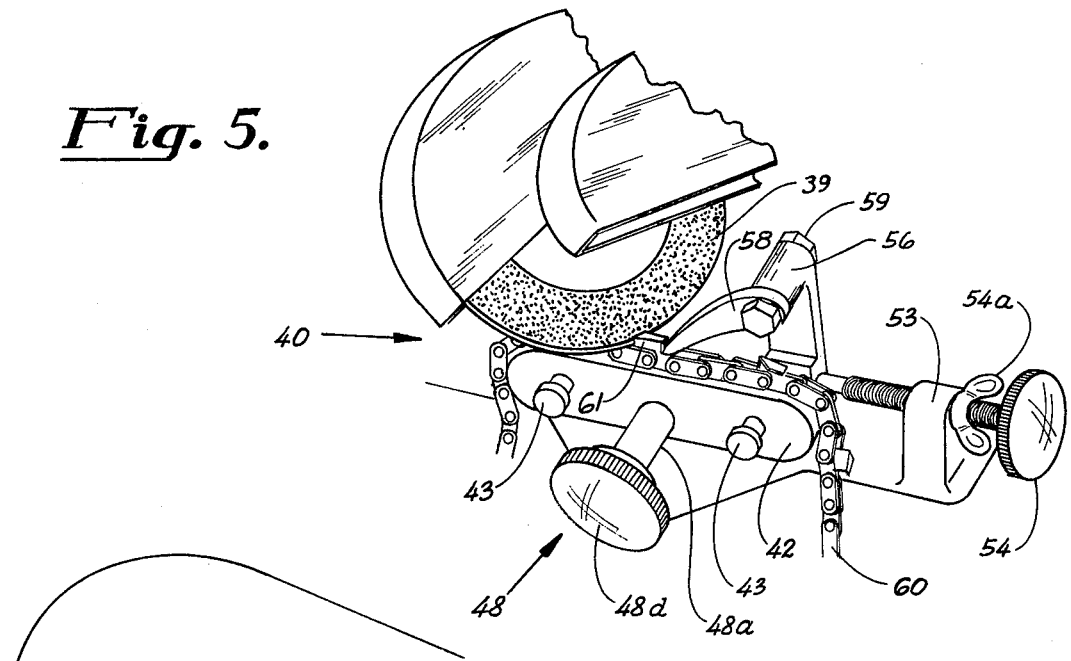
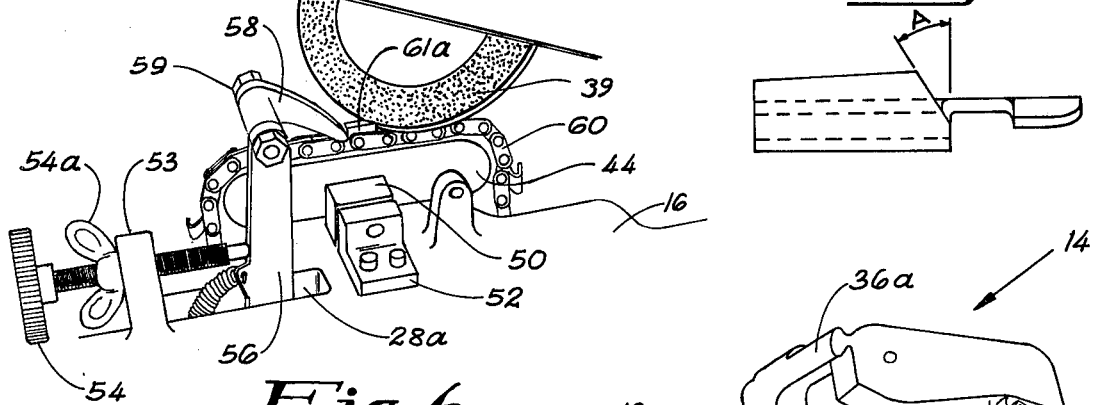
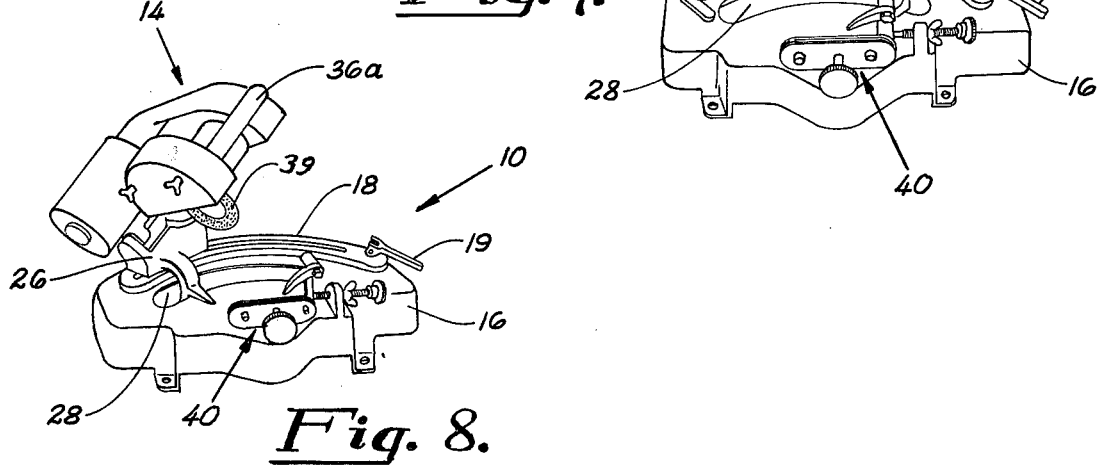

SAW CHAIN GRINDER

BACKGROUND OF THE INVENTION

The present invention relates to saw chain sharpening apparatus, and more particularly to those forms of saw chain sharpening apparatus using a power-driven rotary grinding wheel mounted on a motor arm, the motor arm being shiftable so that the grinding wheel may be positioned for sharpening right and left-hand cutting teeth of a saw chain without removing the saw chain from a clamping device. The present invention is directed to improvements in such apparatus, and more particularly is concerned with providing a self-centering saw chain clamping device which will substantially align and maintain, independently of width, a saw chain's lengthwise centerline on a preselected datum line. Also, the present invention is directed towards providing an improved configuration for offsetting a grinding wheel with respect to the preselected datum line.

Saw chain grinding apparatus which employ a power-driven rotary grinding wheel mounted on a motor arm movable along a base-mounted arcuate guide are known in the art. These devices typically employ a base mounted saw chain clamping or gripping construction which is used to maintain a segment of a saw chain in position for sharpening by the grinding wheel. Associated with the clamping or gripping device is an indexing arm or finger which serves to prevent a saw chain cutting tooth from being moved in one direction while the grinder is used to sharpen the tooth. The grinding wheel, being movable along an arcuate slot, may be first positioned at a preselected location on the arcuate guide for sharpening the right-hand cutting teeth. The wheel is then moved along the arcuate guide to a second position for sharpening the left-hand cutting teeth. The saw chain is indexed along the gripping or clamping device without the necessity of removal therefrom.

A problem present with the prior art saw chain grinding apparatus as described above resides in the fact that the length-wise centerline of a saw chain will not be maintained at a fixed location with respect to the grinding wheel if saw chains of differing widths are successively used in the apparatus. In sharpening right and left-hand cutter elements, it is important that each element be ground uniformly throughout the length of the saw chain. In the prior art, such uniformity was ensured for a saw chain of a particular width by setting the grinder at the factory or by providing clamps which had to be reset for each chain width to be sharpened. However, if an operator in the field desired to sharpen a saw chain having a width different from that accommodated by the factory setting the operator took the chance of imprecisely setting the apparatus.

The present invention overcomes the aforementioned problem by providing a self-centering clamping device which substantially aligns and maintains the lengthwise centerline of a saw chain on a preselected datum line without regard to the saw chain's width. The preselected datum line is intersected by a fixed, reference axis which is the axis about which the motor arm mounting bracket is angularly displaced along the arcuate guide. Because a saw chain's lengthwise centerline is substantially aligned and maintained along the preselected datum line, and because such datum line intersects a reference axis, the position of the grinding wheel with respect to either right or left-hand cutter elements of a saw chain supported in the self-centering clamping device is maintained constant. Thus, it may be readily appreciated that a sharpening operation will proceed uniformly on the cutting elements.

The prior art saw chain sharpening apparatus also presents another problem in that the apparatus must be adjusted through various complicated mechanism to sharpen cutting teeth other than the so-called Oregon type teeth. For instance, it is common to use a grinding apparatus to sharpen micro, semi or super chisel-type saw chain teeth. In order to sharpen such chisel-type teeth, it is necessary to grind such a tooth across the full width thereof. Such full width sharpening requires that the centerline of a rotary grinding wheel be adjusted with respect to the centerline of a supported saw chain length. In order to alter the position of a grinding wheel's centerline with respect to the lengthwise centerline of a supported saw chain, as when changing from sharpening Oregon cutter teeth to sharpening chisel-type teeth, it is desirable to provide axes offset from the reference axis about which the motor arm mounting bracket travels. By providing such offset axes, the relative positions of a centerline of a grinding wheel and the lengthwise centerline of a saw chain may be appropriately adjusted.

SUMMARY OF THE INVENTION

The present invention provides a saw chain sharpening or grinding apparatus which includes a novel self-centering saw chain clamping device for substantially aligning and maintaining, independently of saw chain width, a saw chain's lengthwise centerline on a preselected datum line. The datum line intersects a reference axis about which pivots a positioning arm. The positioning arm controls orientation of the mounting bracket as it is shifted along the arcuate guide. Additionally, the present invention provides that the arcuate guide bar be pivotally mounted on a base so that the offset of the centerline of a grinding wheel with respect to the saw chain centerline may be varied.

An object of the present invention is to provide a saw chain sharpening apparatus in which the saw chain clamping device is self-centering and arranged to substantially align and maintain, independently of saw chain width, the lengthwise centerline of a saw chain along a preselected datum line so that saw chains of different widths may be successively sharpened without complicated adjustments to the apparatus.

Another object of the present invention is to provide an improved saw chain sharpening apparatus in which an arcuate guide track is formed in a base-mounted arcuate guide bar, the arcuate bar being pivotal about an axis so that the centerline of a rotary grinding wheel may be offset with respect to the preselected datum line. By providing pivotal movement of an arcuate guide bar, the selected degree of offset may be maintained precisely when grinding either right- or left-hand cutting teeth of the micro, semi or super (round file) chisel-type chain. This offset allows for the proper top plate cutting angle to be ground across the full width of the top plate of a cutter tooth or link.

Yet another object of the present invention is to provide a means by which proper orientation of the mounting bracket relative to the reference axis may be accurately maintained. To this end, the positioning arm which connects the mounting bracket to the reference axis is provided with a slidable connection between one end thereof and the mounting bracket. It may be readily appreciated that if the arcuate guide bar is pivoted so that the mounting bracket is movable therealong about an axis other than the reference axis, some provision for permitting movement between the positioning arm and mounting bracket is required. The present invention includes a sliding connection between the mounting bracket and the positioning arm so that such movement can occur while maintaining proper orientation of the mounting bracket and elements mounted therein relative to the reference axis.

Additional objects of the present invention reside in the specific construction of the exemplary apparatus hereinafter particularly described in the specification and shown in the several drawings.

BRIEF DESCRIPTION OF THE DRAWINGS

Novel features of the improved saw chain grinding apparatus in accordance with the present invention will be more readily understood from a consideration of the following description taken together with the accompanying drawings, in which a preferred embodiment is illustrated with the various parts thereof identified by suitable reference characters in each of the views, and in which:

FIG. 2 is a top view of the sharpening apparatus with the motor arm removed showing the mounting bracket in solid outline in position when sharpening a left-hand cutter tooth and also in dotted outline showing its position when sharpening a right-hand cutter tooth;

FIG. 3 is a bottom view of the apparatus illustrated in FIG. 2;

FIG. 4 is an enlarged cross-sectional view taken along lines 4—4 of FIG. 2 showing the clamping mechanism of the present invention supporting a saw chain;

FIG. 4a is a cross-sectional view of the clamping mechanism of FIG. 4 in released position;

FIG. 5 is a partial front view of the grinder apparatus illustrating sharpening of a left-hand cutter tooth;

FIG. 6 is a rear view showing grinding of a right-hand cutter tooth viewed from a position interior of the base;

FIG. 7 is a complete view of the assembled grinder apparatus preparatory to sharpening a left-hand cutter tooth;

FIG. 8 is a complete view of the grinder apparatus preparatory to sharpening a right-hand cutter tooth;

FIG. 9 is a top view of a cutter link showing the top plate angle A; and

FIG. 10 is an enlarged cross-sectional view taken along the line 10—10 of FIG. 2 illustrating the pivot connection between the arcuate guide and the base and sliding connection between the mounting bracket and the guide.

DETAILED DESCRIPTION OF THE INVENTION

Figure 1:
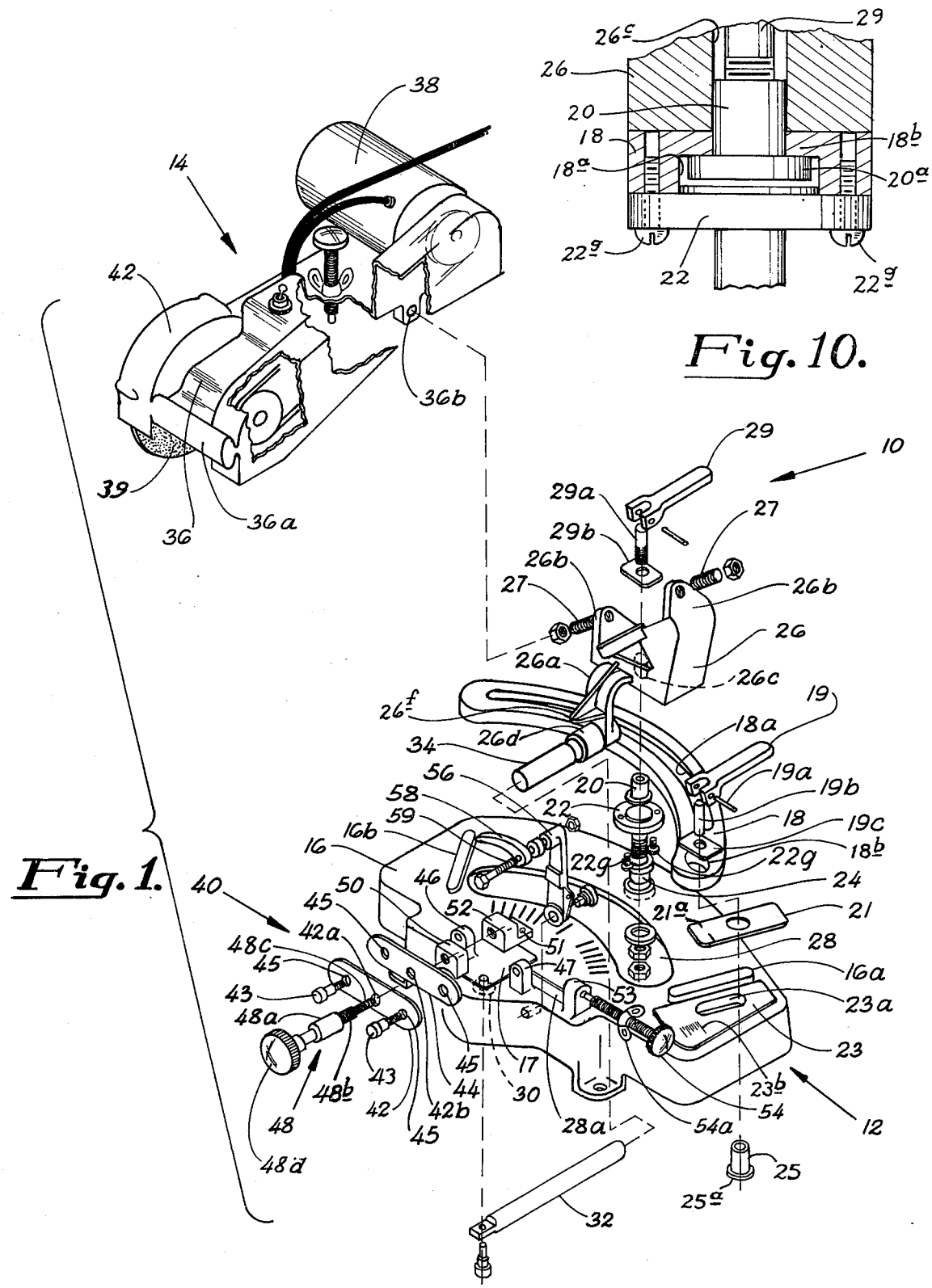
FIG. 1 is an exploded view of the saw chain grinding apparatus of an embodiment of the present invention.

With reference directed initially to FIG. 1 of the drawings, a saw chain grinding apparatus in accordance with the present invention is generally indicated at 10. Saw chain grinder 10 includes a base section indicated at 12 and a motor arm assembly 14.

Base section 12 includes a base plate 16 which serves as a support for saw chain grinder components to be hereinafter described. Base 16 is formed with raised seats 16a, 16b upon which an arcuate guide means, or bar, 18 rests when assembled thereupon. Arcuate guide bar 18 is formed with an arcuate slot, or track, 18a therein and is pivotally connected to an upper surface of base 16 by means of a pivot bar shaft 22. A flanged bearing 24 is secured to base 16 and supports pivot bar shaft 22 which is connected by screws 22a to arcuate guide bar 18 intermediate opposite ends of slot 18a. Such connection provides a pivot axis about which guide bar 18 may be swung parallel to the upper surface of base 16.

A motor arm mounting bracket 26 is arranged to be slidably received on arcuate guide slot 18 for travel therealong. Mounting bracket 26 includes an extension 26a and lugs 26b, the function of which will be later described. A lock handle 29 having a cam surface is connected to a pin 29a for insertion through lock spring 29b and aperture 26c. With reference to FIG. 10, it can be seen that pin 29a depends through aperture 26c and is secured to a cap 20. Cap 20 includes an outer periphery 20a arranged to contact against lip sections 18b when lock handle 29 is disposed in locking position. When lock handle 29 is pivoted to a nonlocking position, pin 29a is permitted to move downwardly so that periphery 20a does not frictionally engage sections 18b. Thus, mounting bracket 26 may be selectively positioned and locked along arcuate guide bar 18. Pin 29a is arranged to slide in slot 18a when lock handle 29 is disengaged from contact against spring 29b.

Extension 26a is inserted through a second arcuate guide slot 28 in the base when the device is assembled (see FIG. 8). A pivot connection 30 defines a reference axis and is arranged on an underside of base 16 to permit connection thereto of an elongate rigid positioning arm 32. The other end of positioning arm 32 is slidably received within a bearing 34 which, in turn, is mounted in a sleeve 26d connected to extension 26a. Positioning arm 32 orients mounting bracket 26 so that it will be maintained with a preselected face directed toward the reference axis when bracket 26 is moved along guide bar 18. For reasons to be hereinafter described, it is required that positioning arm 32 be slidably connected to mounting bracket 26.

Motor arm assembly 14 includes a motor arm 36 which supports a motor 38 drivingly connected by means of a belt and pulley arrangement to a rotary power-driven grinding wheel 39. Arm assembly 14 incorporates a shroud 42 for operator protection. Motor arm 36 further includes a handle 36a. Arm assembly 14 further includes threaded lugs such as shown at 36b (one is hidden) which will be mounted to flanges 26b of motor arm bracket 26 in the assembled configuration. When motor arm 36 is so mounted, (see FIGS. 7 and 8) it will be arranged at an angle obliquely to the plane of base 16. Appropriate bolts 27 and nuts are provided for pivotally connecting motor arm assembly 14 to bracket 16 and providing a pivot axis extending through bolts 27 about which the motor arm assembly may be moved toward and away from the base 16.

A saw chain clamping mechanism in accordance with the present invention is generally designated at 40. Clamping device 40 includes two elongate, laterally opposed members, or bars, 42, 44 which are mounted for movement toward and away from one another on a pair of shoulder screws 43. Shoulder screws 43 extend through spaced bores 45 in elongate bars 42, 44 and are threadedly connected to lugs 46, 47 on base 16.

As is seen in FIGS. 1, 4 and 4a, an elongate clamp screw 48, having a shoulder 48a and threaded segments 48b and 48c is inserted through aligned bores 42a, 44a in elongate clamping bars 42 and 44. Threaded segment 48b extends through the threaded bore of a clamp nut 50 and threaded segment 48c is received in an accommodating threaded bore in a clamp block 52. Threaded segment 48c is threadedly engaged with like threads in clamp block 52 while the threads on segment 48b are threadedly engaged with clamp nut 50. Clamp block 52 is secured to base 16 by means of screws 51. A plate 17 is provided for mounting. For reasons to be hereinafter described, clamp nut 50 is allowed to travel along clamp screw 48 relative to base 16 as such screw is rotated for further engagement with clamp block 52. Clamp screw 48 is provided with a knob 48d to facilitate rotation thereof.

A feed adjustment screw assembly 54 is threadedly secured through support 53 and is further provided with a tightening wing nut 54a. Disposed through a slot 28a in base 16 is a feed arm assembly 56 which is pivotally connected to an underside of base 16. A pawl 58 is pivotally connected by means of a bolt 59 to feed arm assembly 56. The function of feed adjustment screw assembly 54 and feed arm assembly 56 will be described later.

Turning now to FIGS. 2–4a, features of clamping mechanism 40 will be more particularly described. FIG. 2 is a top view of base 16 with motor arm assembly 14 removed for clarity. Arcuate guide means 18 is shown in solid line in FIG. 2 in one operating position and in dot-dashed outline swung about pivot bar shaft 22 to a different operating portion as will be described below. Mounting bracket 26 is shown in solid outline in FIG. 2 positioned for sharpening a left-hand cutter link. The dotted outline of mounting bracket 26 shown on the left represents the position for sharpening right-hand cutter links. Base 16 includes a zero reference mark at 16c and further includes scales to either side thereof for showing the amount of angular displacement of mounting bracket 26 either to the left or right of zero reference 16c. It is to be noted that the pivot point 30 intersects a preselected datum line 31 which is that line along which the lengthwise centerline of a saw chain will be disposed when the chain is to be sharpened. In FIG. 2, clamping mechanism 40 is shown closed to grip a saw chain therein.

In FIG. 3, a bottom view of the apparatus more clearly illustrates positioning arm 32 which orients mounting bracket 26 so that it will be maintained with a preselected face directed toward reference axis 30.

With reference now directed to FIG. 4, the specific operation of the clamping mechanism 40 will be described. As heretofore stated, it is desirable to maintain the lengthwise centerline of a saw chain, regardless of saw chain width, on a preselected datum line. Such a datum line is shown at 31 in FIGS. 2 and 3 and lies in a plane 31a, such plane being parallel to elongate bars 42, 44 and disposed intermediate thereof. The present invention provides that clamping mechanism 40 will maintain and substantially align a saw chain's lengthwise centerline along datum line 31, by providing a construction in which elongate bars 42, 44 will move simultaneously toward the preselected datum line at equal rates. To accomplish such, the present invention utilizes the dual threaded clamp screw 48 which extends loosely through apertures 42a, 44a in the elongate clamping bars 42, 44. Segment 48c of clamp screw 48 has threads which are formed with one-half the lead of those threads on concentric segment 48b. Threads 48c engage receiving threads in clamp block 52 while threads 48b engage receiving threads in clamp nut 50. Threads 48c will not threadably engage the threads in clamp nut 50.

The threads on segments 48b, 48c are so formed that upon rotation of the screw to cause it to screw further into clamp block 52 (and move to the right in FIGS. 4 and 4a) the threads on segment 48b produce movement of clamp nut 50 away from block 52 (to the left in FIGS. 4, 4a). Considering the construction shown in FIG. 4a, with the elongate clamping bars initially open to receive a saw chain, a clockwise rotation of screw 48 will cause threads 48c to move into further engagement with clamp block 52. During such a rotation, shoulder portion 48a will displace elongate clamping bar 42 to the right. Clamp nut 50 will simultaneously move to the left thereby displacing elongate clamping bar 44 to the left. Because the threads on segment 48b have twice the lead of the threads on segment 48c, elongate clamping bars 42, 44 move at equal rates toward datum line 31.

Thus, it can be appreciated that if clamping mechanism 40 is initially disposed in a position such as shown in FIG. 4a and a saw chain is placed within the opening of elongate bars 42, 44, such bars may be simultaneously displaced toward preselected datum line 31 to clamp such saw chain segment, regardless of its width, in a position substantially aligned on the preselected datum line. Such is the result shown in FIG. 4a wherein a saw chain segment 49 has its guide links 49a securely held between clamping bars 42, 44.

A typical sharpening operation for the so-called Oregon, or chipper-type, cutter link will now be described with reference to FIGS. 5–9. With the motor arm and grinding wheel raised as shown in FIG. 7, a saw chain, such as chain 60, is placed in seated position along elongate bars 42, 44 as shown in FIG. 5. A rear edge of cutting tooth 61 is moved to the right as viewed in FIG. 5 against pawl 58. Clamp screw 48 then is rotated clockwise to simultaneously displace elongate clamping bars 42, 44 toward datum line 31 so that saw chain 60 may be rigidly secured between the elongate clamping bars with cutting tooth 61 in position for sharpening. The position of pawl 58 is adjusted by operation of feed adjustment screw assembly 54 which may be shifted to vary the position of pawl 58. As shown in FIG. 5, rotary grinding wheel 39 then is moved downwardly so as to sharpen cutter link 61. FIG. 7 shows saw chain grinder apparatus 10 in a raised position before rotary grinding wheel 39 is lowered for sharpening a left-hand cutter link.

In FIG. 6, the sharpening of a right-hand cutter link 51a is shown. Before the right-hand cutter links are sharpened, saw chain 60 is indexed along clamping bars 42, 44 until all the left-hand cutter links are sharpened. Lock handle 29 is released to permit pin 29a to move downwardly so that cap 20 does not frictionally engage lip sections 18b. Thereafter, motor arm assembly 14 is angularly displaced along arcuate guide bar 18 to a preselected top plate cutting angle as shown in FIG. 8. FIG. 6 is a partial view shown looking in from the rear of base 16 and shows rotary grinding wheel 39 sharpening a right-hand cutter link 61a.

A chipper cutter link is shown in FIG. 9. It can be seen that a top plate angle such as indicated at A will be specified for a given saw chain. The top plate angle is set on the base 16 by moving mounting bracket 26 so that an indicator 26f on extension 26a points to a preselected angle indicator mark on either side of reference 16c.

It is often desirable to be able to position the grinding wheel with its center offset to one side or the other of the centerline of the saw chain held in clamping assembly 40. For instance, micro, semi or super (round file) chisel-type cutter links need to have a top plate cutting angle ground across the full width. In order to accurately offset the centerline of grinding wheel 39 with respect to the preselected datum line, arcuate guide means 18 is pivoted about pivot bar shaft 20 either in the direction of arrows B or C in FIG. 2. As shown in FIG. 2, guide bar 18 has been shifted to that position shown in dot-dashed outline. Mounting bracket 26 will now be movable along guide bar 18 about a new axis which is offset from reference axis 30. In order for mounting bracket 26 to be so moved, bearing 34 is slidable in sleeve 26d.

A releasable locking mechanism is provided so that guide bar 18 may be pivoted and then locked in position. A lock handle 19 having a cam surface is connected by means of a pin 19a to a clamp screw 19b. Clamp screw 19b is inserted through a lock spring 19c and aperture 18b in guide bar 18. Further, clamp screw 19b is disposed through an apertured indicator 21 and is held by means of a threaded cap 25 within elongate slot 23a. Elongate slot 23a is formed in scale 23 which is secured to base 16. Cap 25 is provided with an outer periphery 25a which frictionally engages an underside portion of base 16 when lock handle 19 is moved so that its cam surface contacts lock spring 19c. Thus, it can be seen that when lock handle 19 is released, clamp screw 19b may be moved along elongate slot 23a to thereby pivot guide bar 18 about pivot bar shaft 22. Indicator 21 is provided with a reference mark 21a which may be read against marks 23b on scale 23 to display the amount of offset.

When it is desired to provide an offset between the centerline of rotary grinding wheel 39 and preselected datum line 31, lock handle 19 is released from a locking position so that arcuate guide means 18 may be pivoted about pivot bar shaft 20 in the directions of arrows B or C as shown in FIG. 2. For purposes of illustration, assume that mounting bracket 26 is positioned to the left of zero reference 16c as shown by the dotted lines in FIG. 2. If bar 18 is pivoted about pivot point 20 in the direction of arrow B, the face of grinding wheel 39 will be moved further across the width of a right-hand cutting link and thus be offset in a direction away from the viewer in FIG. 6. The right-hand cutter link may now be ground across its full width. Mounting bracket 26 may be then moved an equal distance to the right of zero reference 16c so that a left-hand cutter link may be ground across its full width.

Because guide bar 18 is arcuate, if mounting bracket 26 is moved to equal angle positions on opposite sides of zero reference 16c, the amount of offset will be the same when grinding either a right or left-hand cutter link. Thus, to set the degree of offset is greatly simplified.

Explaining briefly a sequence of operation for the apparatus thus described, and assuming that it is desired to sharpen chain teeth in which an offset of the grinding wheel is required, locking handle 19 is first released to permit swinging of arcuate guide 18 to a desired position as indicated by the relationship between reference mark 21a on indicator bar 21 movable with one end of guide bar 18 and its relationship to the scale marks 23b on scale 23. The relationship between such indicator and scale is used to select the amount of offset which will be provided for the grinding wheel relative to the datum line for the saw chain. After this offset is established, locking handle 19 is secured to lock the guide bar in position.

Chain holding bars 42, 44 then are opened as illustrated in FIG. 4a to receive a saw chain therebetween, the saw chain is inserted as illustrated in FIG. 4 and the screw 48 is operated to bring bars 42, 44 into position to support a section of the chain but not to clamp it tightly therein. The saw chain then is moved to the right as illustrated in FIG. 5 into a position in which a chain tooth to be sharpened has its rear edge abutting pawl 58. This positions the saw chain for grinding and then screw 48 is further tightened to bring clamp bars 42, 44 into secure clamping relation against opposite sides of the saw chain as shown in FIG. 4. As previously described, with the clamp bars thus held tightly against the saw chain the centerline of the saw chain is aligned on datum line 31 and resting within plane 31a between the clamp bars.

To sharpen a left-hand tooth, the mounting bracket is swung to the position illustrated in solid outline in FIG. 2 to a specified degree of angular offset from the zero reference mark 16c. This is accomplished by loosening locking handle 29 to allow sliding movement of the mounting bracket along guide bar 18. Upon arriving at the proper angular position, the clamping handle is relocked. Throughout such swinging of the mounting bracket and motor arm, positioning arm 32, disposed beneath the base 16 maintains a proper orientation of the mounting bracket 26, motor arm 36 and grinding wheel 39 whereby they are directed at central pivot point 30. The sliding connection between positioning arm 32 and the mounting bracket 26 permits the mounting bracket to move toward selected offset positions with the preset positioning of arcuate guide bar 18. Thus, assuming guide bar 18 has been swung in the direction of arrow B in FIG. 2, when the mounting bracket is in the position illustrated in solid outline in FIG. 2, the grinding wheel will be offset from datum line 31 in a direction toward guide bar 18.

With the mounting bracket and chain thus locked in position, the first tooth is sharpened as illustrated in FIG. 5 by swinging the grinding wheel into grinding relationship with the tooth. After this tooth is ground, clamp screw 48 is loosened, the chain is moved forwardly until the next left-hand tooth is adjacent pawl 58 and may be positioned thereagainst after which screw 48 is tightened. The grinding operation then is performed on all of alternate links along the chain to thereby sharpen all of the left-hand cutter teeth on the chain.

Subsequently, to sharpening all of the right-hand teeth on the chain, locking lever 29 is released, mounting bracket 26 is swung to the position illustrated in dot-dashed outline in FIG. 2, and is locked in a position in equal angular displacement to the left of zero reference mark 16c as it previously occupied on the right hand side of zero marking 16c. In this position and with the arcuate guide bar 18 still swung to and locked in the position in the direction of arrow B, the grinding wheel will be offset away from the viewer as illustrated in FIG. 6. The above explained operation for sharpening teeth then is performed on the right-hand teeth distributed alternately along the length of the chain.

While the invention has been particularly shown and described with reference to the foregoing preferred embodiment thereof, it will be understood by those skilled in the art that other changes in form and detail may be made therein without departing from the spirit and scope of the invention as defined in the appended claims.

What is claimed is:

1. A grinder for sharpening saw chain cutting teeth comprising:

a base;

a mounting bracket:

arcuate guide means disposed adjacent to said base for receiving said mounting bracket and enabling the mounting bracket to be angularly displaced therealong about a preselected, fixed reference axis;

a power-driven, rotary grinding wheel;

an elongate arm supporting said grinding wheel adjacent one end thereof, said arm having its other end pivotally connected to said mounting bracket obliquely thereto permitting selective movement of said grinding wheel toward and away from said base; and releasable clamping means connected to said base for supporting a length of saw chain with a selected one of its cutting teeth in position for sharpening by said grinding wheel, said clamping means including opposed, substantially parallel first and second elongate members adapted to receive saw chain links therebetween, and means connected to said elongate members selectively operable for simultaneously displacing said elongate members at an equal rate relative to a preselected datum line for clamping a saw chain link therebetween with the saw chain's lengthwise centerline substantially aligned and maintained, independently of saw chain width, on said datum line, said means for simultaneously displacing said elongate members including a clamp block and a clamp screw having a first threaded segment for engaging like threads in said clamp block, said clamp screw including a second threaded segment concentric with said first threaded segment, said second threaded segment having a thread lead twice that of said first threaded segment, and contacting means including a movable clamp nut threadably engaged with said second threaded segment, said movable clamp nut disposed between said clamp block and one of said elongate members, said clamp screw having abutment means arranged for abutment against the other of said elongate members so that when said clamp screw is rotated for further engagement with said clamp block, said abutment means and said movable clamp nut contact and simultaneously displace their associated elongate members at an equal rate toward said preselected datum line.

2. A grinder as defined in claim 1 wherein said mounting bracket includes a positioning arm having one end thereof connected to said mounting bracket and the other end thereof pivotally connected to said base so that said positioning arm pivots in a plane substantially parallel to said base about said reference axis and maintains a face of said mounting bracket directed toward said reference axis.

3. A grinder as defined in claim 2 wherein said base includes an opening through which depends a mounting bracket extension slidably connected to said positioning arm.

4. A grinder as defined in claim 3 wherein said mounting bracket further includes an indicating means for displaying angular displacement of said mounting bracket about said reference axis.

5. A grinder for sharpening saw chain cutting teeth comprising:

a base having an upper surface;

a mounting bracket;

arcuate guide means disposed adjacent said upper surface for receiving said mounting bracket and enabling the mounting bracket to be angularly displaced therealong about a preselected reference axis;

a power-driven, rotary grinding wheel;

an elongate arm supporting said grinding wheel adjacent one end thereof, said arm having its other end pivotally connected to said mounting bracket permitting selective movement of said grinding wheel toward and away from said upper surface;

releasable clamping means connected to said base for supporting a length of said chain with a selected one of its cutting teeth in position for sharpening by said grinding wheel, said clamping means including opposed, substantially parallel first and second elongate members adapted to receive saw chain links therebetween, and means operatively connected to said elongate members selectively operable for simultaneously displacing said elongate members at an equal rate relative to a preselected datum line for clamping a saw chain link therebetween with the saw chain's lengthwise centerline substantially aligned and maintained, independently of saw chain width, on said datum line, said means for simultaneously displacing said elongate members including a clamp block and a clamp screw having a first threaded segment for engaging like threads in said clamp block, said clamp screw including a second threaded segment concentric with said first threaded segment, said second threaded segment having a thread lead twice that of said first threaded segment, and contacting means including a movable clamp nut threadably engaged with said second threaded segment, said movable clamp nut disposed between said clamp block and one of said elongate members, said clamp screw having abutment means arranged for abutment against the other of said elongate members so that when said clamp screw is rotated for further engagement with said clamp block, said abutment means and said movable clamp nut contact and simultaneously diplace their associated elongate members at an equal rate toward said preselected datum line; and means pivotally connecting said arcuate guide means to said base permitting selective positioning of said arcuate guide means about a pivot axis in a place generally parallel to said upper surface to enable said mounting bracket to be positioned at various selected offset distances from said reference axis.

6. A grinder as defined in claim 5 wherein said arcuate guide means includes an elongate arcuate guide which slidably receives said mounting bracket.

7. A grinder as defined in claim 6 wherein said means pivotally connecting said arcuate guide means to the base is disposed intermediate opposite ends of said guide track.

8. A grinder as defined in claim 6 which further comprises a positioning arm connected to said base for pivotal movement about said reference axis in a plane generally parallel to said upper surface, said positioning arm being movably connected to said mounting bracket to permit shifting of said mounting bracket toward or away from said reference axis and to maintain a preselected portion of said mounting bracket directly facing said reference axis throughout angular displacement of said mounting bracket along said arcuate guide means.

9. A grinder as defined in claim 8 wherein an opening is provided in said base, through which depends a mounting bracket extension slidably connected to said positioning arm.

10. A grinder as defined in claim 9 wherein said mounting bracket includes indicating means for displaying angular displacement of said mounting bracket along said arcuate guide means with respect to said reference axis.

11. For use in a saw chain grinder, a self-centering device which includes releasable clamping means adapted to be connected to the grinder for supporting a length of said chain, said clamping means including opposed, substantially parallel first and second elongate members adapted to receive saw chain links therebetween, and means operatively connected to said elongate members selectively operable for simultaneously displacing said elongate members at an equal rate relative to a preselected datum line for clamping a saw chain link therebetween with the saw chain's lengthwise centerline substantially aligned and maintained, independently of saw chain width, on said datum line, said means for simultaneously displacing said elongate members including a clamp block and a clamp screw having a first threaded segment for engaging like threads in said clamp block, said clamp screw including a second threaded segment concentric with said first threaded segment, said second threaded segment having a thread lead twice that of said first threaded segment, and contacting means including a movable clamp nut threadably engaged with said second threaded segment, movable clamp nut disposed between said clamp block and one of said elongate members, said clamp screw having abutment means arranged for abutment against the other of said elongate members so that when said clamp screw is rotated for further engagement with said clamp block, said abutment means and said movable clamp nut contact and simultaneously displace their associated elongate members at an equal rate toward said preselected datum line.

* * * * *